(12) United States Patent
Smith

(10) Patent No.: US 11,572,979 B2
(45) Date of Patent: Feb. 7, 2023

(54) GREASE GUN MOUNTING ASSEMBLY

(71) Applicant: Kenneth Smith, Phoenix, AZ (US)

(72) Inventor: Kenneth Smith, Phoenix, AZ (US)

( * ) Notice: Subject to any disclaimer, the term of this patent is extended or adjusted under 35 U.S.C. 154(b) by 288 days.

(21) Appl. No.: 16/990,078

(22) Filed: Aug. 11, 2020

(65) Prior Publication Data

US 2022/0049815 A1 Feb. 17, 2022

(51) Int. Cl.
*F16M 11/00* (2006.01)
*F16N 3/12* (2006.01)
*F16M 13/02* (2006.01)

(52) U.S. Cl.
CPC ............. *F16N 3/12* (2013.01); *F16M 13/02* (2013.01)

(58) Field of Classification Search
CPC .................................. F16N 3/12; F16M 13/02
See application file for complete search history.

(56) References Cited

U.S. PATENT DOCUMENTS

| | | | | |
|---|---|---|---|---|
| 3,401,847 A * | 9/1968 | Downing | ............... | B05C 17/015 222/391 |
| 4,093,170 A | 6/1978 | Spray | | |
| 4,254,926 A * | 3/1981 | Reeberg | ................... | F16N 13/08 248/152 |
| 4,867,360 A * | 9/1989 | Howard | ................... | A47L 13/51 224/663 |
| 5,080,240 A | 1/1992 | Williams | | |
| 5,302,302 A * | 4/1994 | Shelley | ..................... | A45F 5/02 224/679 |
| 5,871,106 A * | 2/1999 | Oksa | ..................... | F16M 11/041 248/314 |
| D409,381 S * | 5/1999 | Cleveland | ..................... | D3/228 |
| 6,491,191 B1 * | 12/2002 | Cleveland | ................. | A45F 5/00 224/904 |
| 6,530,170 B1 * | 3/2003 | Sweeney | ................ | A01K 97/10 43/21.2 |
| 6,698,601 B1 * | 3/2004 | Nez | ......................... | F16M 13/02 224/904 |
| D510,015 S * | 9/2005 | Hostetler | ....................... | D8/373 |
| 7,063,298 B2 | 6/2006 | Henry | | |
| 7,455,196 B2 | 11/2008 | Montgomery | | |
| 7,823,753 B2 * | 11/2010 | Kovac | ................ | B65D 83/0072 222/391 |
| 9,447,918 B2 * | 9/2016 | Prest | ..................... | B25H 1/0064 |
| D917,659 S * | 4/2021 | Pratt | .......................... | A45F 5/02 D22/147 |

FOREIGN PATENT DOCUMENTS

WO WO2005042211 5/2005

* cited by examiner

*Primary Examiner* — Amy J. Sterling

(57) ABSTRACT

A grease gun mounting assembly for mounting a grease gun to a piece of equipment requiring routine greasing includes a connector, which has engaged thereto a first tube and a second tube with the first tube and the second tube being substantially parallel. The first tube is sized for insertion of a grease gun into an upper end thereof. The second tube is sized for insertion of a hose extending from the grease gun. The connector is engageable to an object, such as a piece of equipment requiring routine greasing, so that the first tube and the second tube are selectively engageable to the object. The grease gun and the hose can be inserted into the first tube and the second tube, respectively, for mounting the grease gun and the hose to the object.

12 Claims, 4 Drawing Sheets

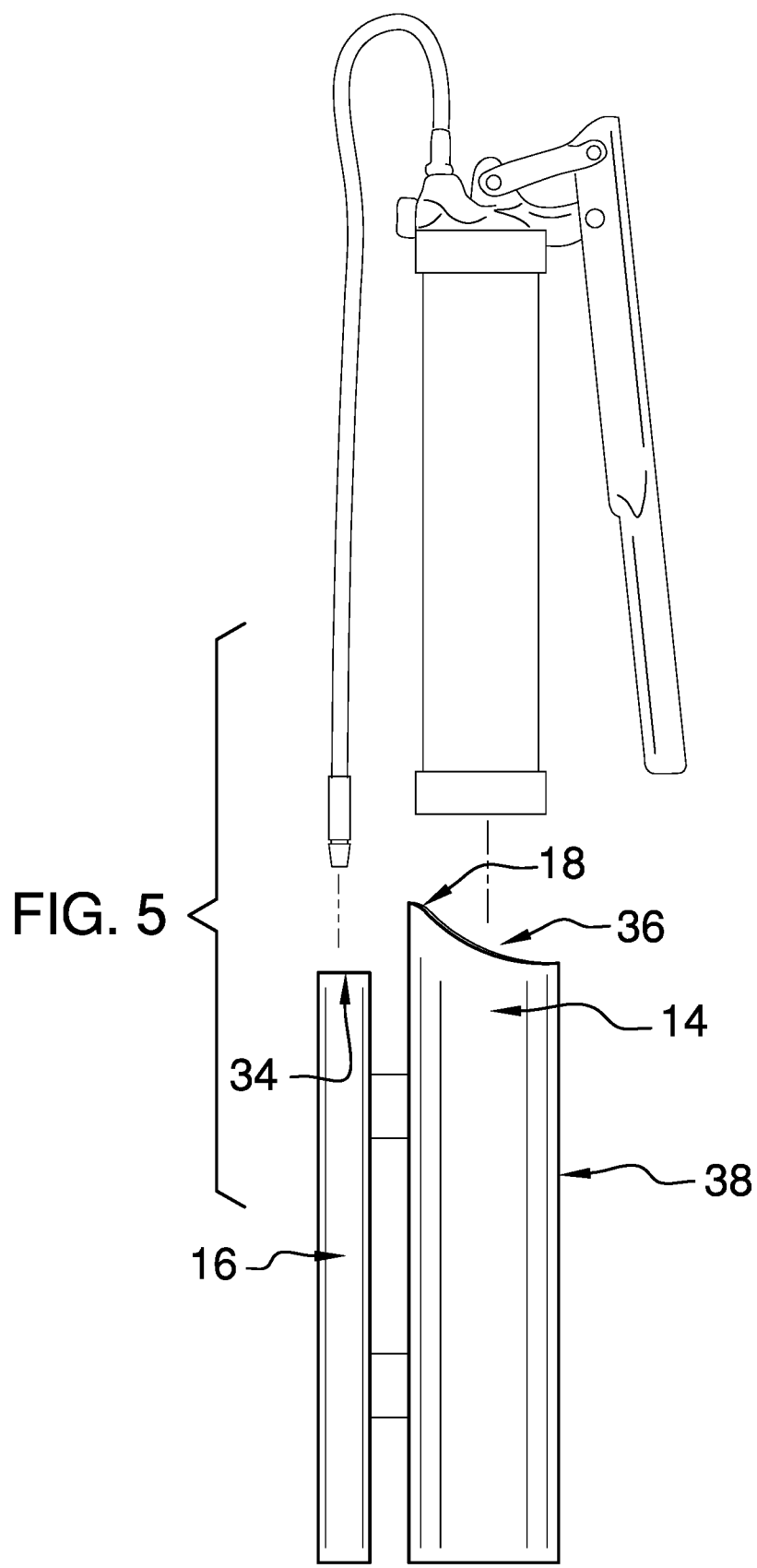

GREASE GUN MOUNTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mounting assemblies and more particularly pertains to a new mounting assembly for mounting a grease gun to a piece of equipment requiring routine greasing.

(2) Description of Related Art Including Information Disclosed Under 37 CFR 1.97 and 1.98

The prior art relates to mounting assemblies. Prior art mounting assemblies for grease guns may comprise a brace having a hole positioned therethrough for insertion of a grease gun, surface mounted clips or brackets that engage a grease gun, tubes designed for insertion of a grease gun and for bracketing to a wall, and brackets magnetically engageable to metal substrates.

BRIEF SUMMARY OF THE INVENTION

An embodiment of the disclosure meets the needs presented above by generally comprising a connector, which has engaged thereto a first tube and a second tube with the first tube and the second tube being substantially parallel. The first tube is sized so that the first tube is configured for insertion of a grease gun into an upper end thereof. The second tube is sized so that the second tube is configured for insertion of a hose extending from the grease gun.

The connector is configured to be engageable to an object, such as a piece of equipment requiring routine greasing, so that the first tube and the second tube are selectively engageable to the object. The first tube and the second tube are configured for insertion of the grease gun and the hose, respectively, for mounting the grease gun and the hose to the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an in-use view of an embodiment of the disclosure.

DETAILED DESCRIPTION OF THE INVENTION

Figure 1:
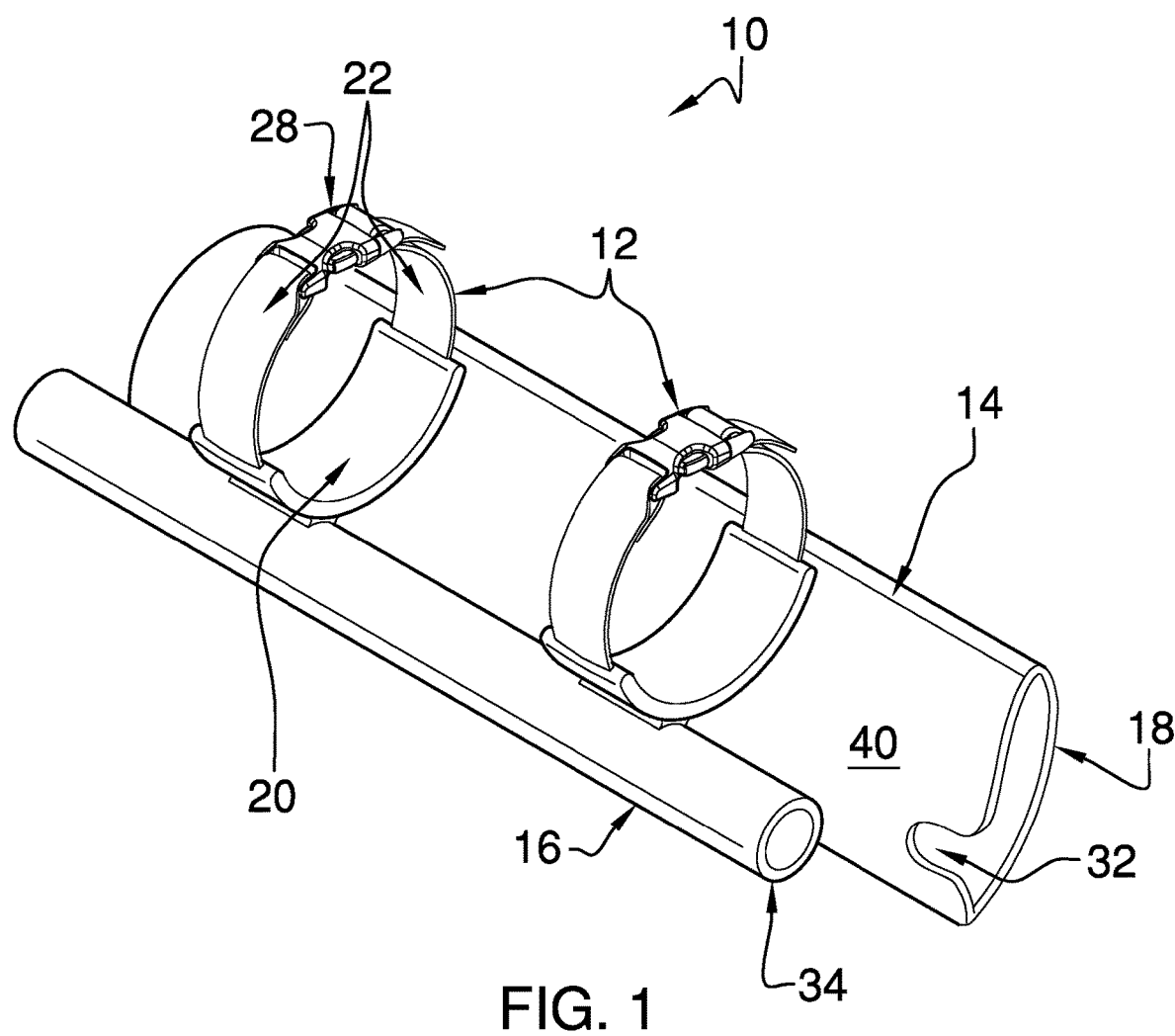
FIG. 1 is an isometric perspective view of a grease gun mounting assembly according to an embodiment of the disclosure.

With reference now to the drawings, and in particular to FIGS. 1 through 5 thereof, a new mounting assembly embodying the principles and concepts of an embodiment of the disclosure and generally designated by the reference numeral 10 will be described.

As best illustrated in FIGS. 1 through 5, the grease gun mounting assembly 10 generally comprises a connector 12, which has engaged thereto a first tube 14 and a second tube 16, with the first tube 14 and the second tube 16 being substantially parallel. The first tube 14 is sized so that the first tube 14 is configured for insertion of a grease gun into an upper end 18 thereof. The second tube 16 is sized so that the second tube 16 is configured for insertion of a hose extending from the grease gun.

Figure 4:
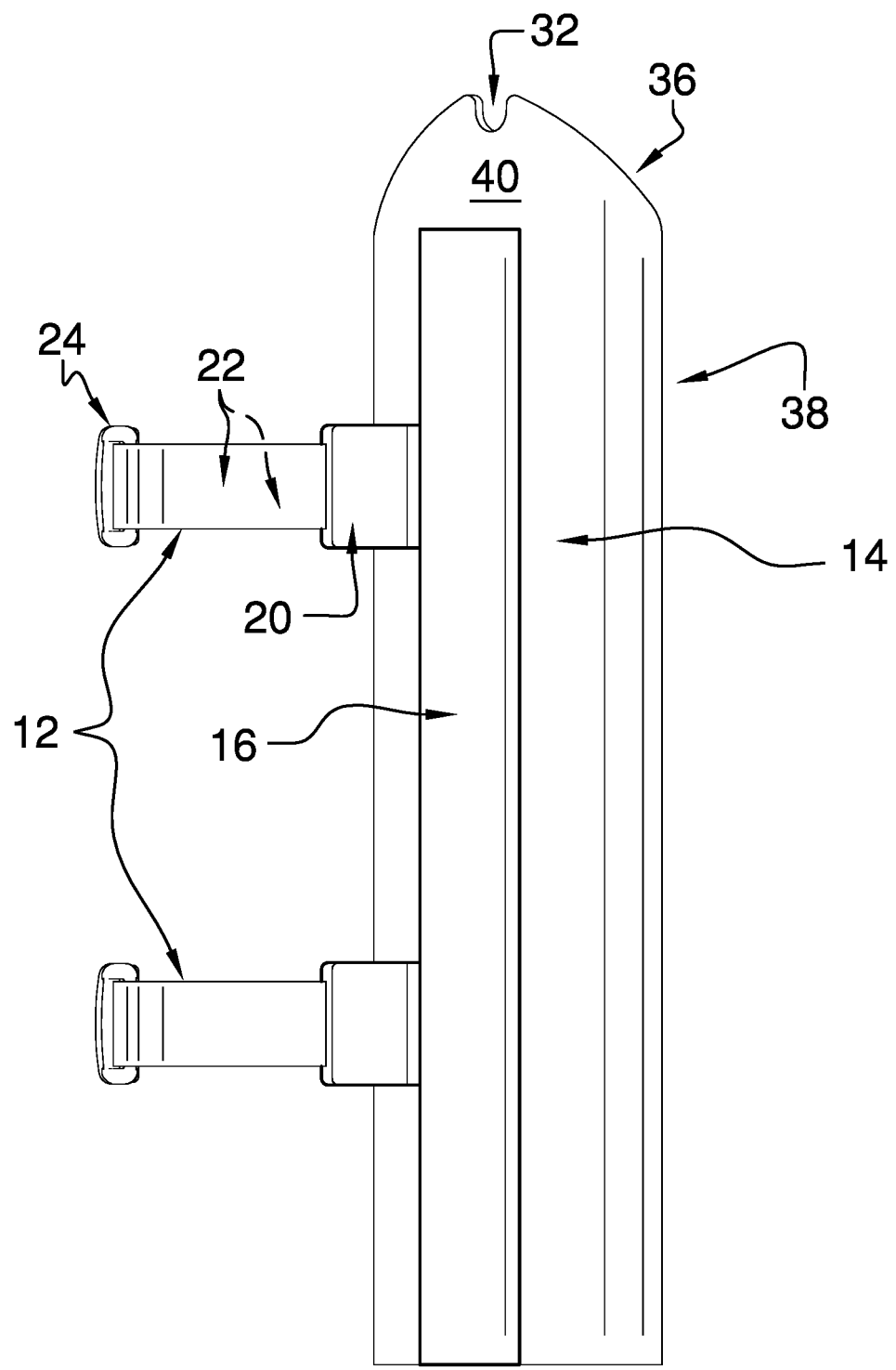
FIG. 4 is a side view of an embodiment of the disclosure.

The connector 12 is configured to be engageable to an object, such as a piece of equipment requiring routine greasing, so that the first tube 14 and the second tube 16 are selectively engageable to the object. The first tube 14 and the second tube 16 are configured for insertion of the grease gun and the hose, respectively, as shown in FIG. 5, for mounting the grease gun and the hose to the object. The connector 12 is one of a set of connectors 12, which may comprise two connectors 12 bracketing a midpoint of the first tube 14, as shown in FIG. 4.

Figure 2:
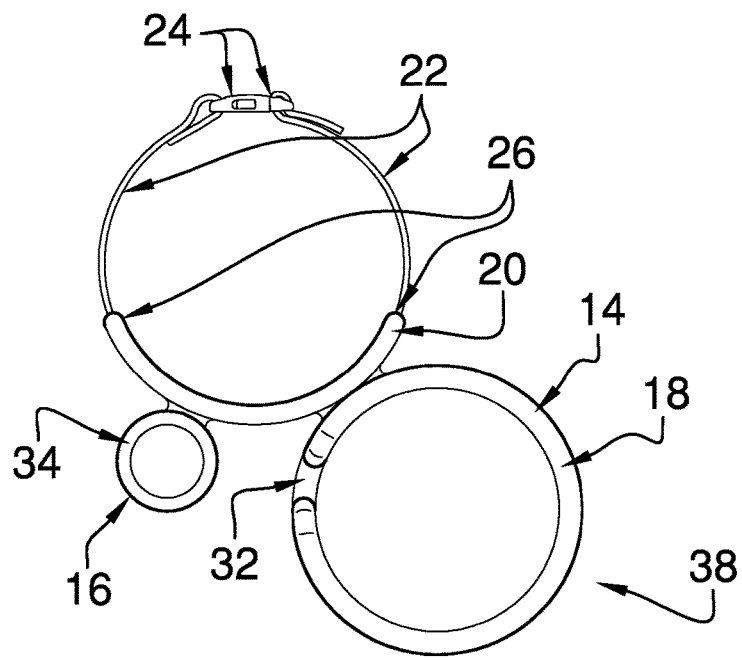
FIG. 2 is an end view of an embodiment of the disclosure.

In one embodiment, as shown in FIG. 2, the connector 12 comprises a bar 20, a pair of straps 22, and a pair of fasteners 24. The bar 20 is arcuate. Each strap 22 is engaged to and extends from a respective opposed end 26 of the bar 20. Each fastener 24 is engaged to a respective strap 22 distal from the bar 20. The fasteners 24 are mutually engageable. The straps 22 are configured to be looped around an element, such as a framing element of the object, so that one fastener 24 is positioned to engage the other fastener 24 to engage the first tube 14 and the second tube 16 to the object. The fasteners 24 may comprise a side release buckle 28, or other fastening means, such as, but not limited to, hook and loop couplers, pipe clamps, and the like.

Figure 3:
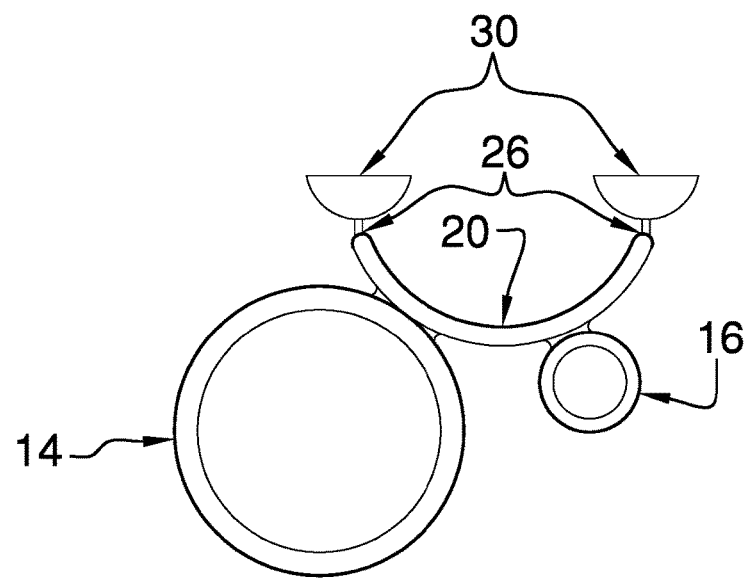
FIG. 3 is an end view of an alternative embodiment of the disclosure.

In another embodiment, as shown in FIG. 3, the connector 12 comprises the bar 20 and a set of cups 30, which is engaged to the bar 20. The cups 30 are resiliently compressible and are configured to be compressed between the bar 20 and a surface of the object, such as a glass panel, to suctionally engage the first tube 14 and the second tube 16 to the object. The cups 30 comprises at least one of rubber, silicone, and elastomer.

The first tube 14 has a notch 32 extending thereinto from the upper end 18 so that the notch 32 is proximate to the second tube 16. The notch 32 is configured to position the hose to facilitate insertion of the hose into the second tube 16. The second tube 16 is dimensionally shorter than the first tube 14 so that an upper limit 34 of the second tube 16 is positioned below the notch 32, as shown in FIG. 4.

The first tube 14 has a cutout 36 extending thereinto from the upper end 18. The cutout 36 tapers arcuately from a first face 38 of the first tube 14, opposite the notch 32, to a second face 40 of the first tube 14, in which the notch 32 is positioned. The cutout 36 is configured to receive a handle of the grease gun as the grease gun is inserted into the first tube 14.

In use, the straps 22 of each connector 12 are positioned around a framing element of the piece of equipment and the side release buckle 28 is fastened to engage the assembly 10 to the heavy piece of equipment. The first tube 14 and the second tube 16 are configured for insertion of the grease gun and the hose, respectively, for mounting the grease gun and the hose to the piece of equipment, where they are readily available when greasing of the piece of equipment is required.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded.

A reference to an element by the indefinite article "a" does not exclude the possibility that more than one of the elements is present, unless the context clearly requires that there be only one of the elements.

I claim:

1. A grease gun mounting assembly comprising:
   a connector having engaged thereto a first tube and a second tube, such that the first tube and the second tube are substantially parallel, the first tube being sized such that the first tube is configured for insertion of a grease gun into an upper end thereof, the second tube being sized such that the second tube is configured for insertion of a hose extending from the grease gun, the connector being configured to be engageable to an object such that the first tube and the second tube are selectively engageable to the object, wherein the first tube and the second tube are configured for insertion of the grease gun and the hose, respectively, for mounting the grease gun and the hose to the object; and
   wherein the connector comprises:
      a bar; and
      a set of cups engaged to the bar, the cups being resiliently compressible, wherein the cups are configured for compressing between the bar and a surface of the object for suctionally engaging the first tube and the second tube to the object.

2. The grease gun mounting assembly of claim 1, further including the first tube having a notch extending thereinto from the upper end, such that the notch is proximate to the second tube, wherein the notch is configured for positioning of the hose for facilitating insertion of the hose into the second tube.

3. The grease gun mounting assembly of claim 2, further including the first tube having a cutout extending thereinto from the upper end, the cutout tapering arcuately from a first face of the first tube, opposite the notch, to a second face of the first tube, in which the notch is positioned, wherein the cutout is configured for receiving a handle of the grease gun as the grease gun is inserted into the first tube.

4. The grease gun mounting assembly of claim 1, further including:
   the first tube having a notch extending thereinto from the upper end, such that the notch is proximate to the second tube, wherein the notch is configured for positioning of the hose for facilitating insertion of the hose into the second tube; and
   the second tube being dimensionally shorter than the first tube, such that an upper limit of the second tube is positioned below the notch.

5. The grease gun mounting assembly of claim 4, further including the first tube having a cutout extending thereinto from the upper end, the cutout tapering arcuately from a first face of the first tube, opposite the notch, to a second face of the first tube, in which the notch is positioned, wherein the cutout is configured for receiving a handle of the grease gun as the grease gun is inserted into the first tube.

6. The grease gun mounting assembly of claim 1, further including the connector being one of a set of connectors.

7. The grease gun mounting assembly of claim 6, wherein the set of connectors comprises two connectors bracketing a midpoint of the first tube.

8. A grease gun mounting assembly comprising:
   a connector having engaged thereto a first tube and a second tube, such that the tube and the second tube are substantially parallel, the first tube being sized such that the first tube is configured for insertion of a grease gun into an upper end thereof, the second tube being sized such that the second tube is configured for insertion of a hose extending from the grease gun, the connector being configured to be engageable to an object such that the first tube and the second tube are selectively engageable to the object, wherein the first tube and the second tube are configured for insertion of the grease gun and the hose, respectively, for mounting the grease gun and the hose to the object; and
   wherein the connector comprises:
      a bar, the bar being arcuate;

a pair of straps, each strap being engaged to and extending from a respective opposed end of the bar;

a pair of fasteners, each fastener being engaged to a respective strap distal from the bar, the fasteners being mutually engageable, wherein the straps are configured for looping around an element of the object, such that one fastener is positioned for engaging the other fastener for engaging the first tube and the second tube to the object.

9. The grease gun mounting assembly of claim 8, wherein the pair of fasteners comprises a side release buckle.

10. The grease gun mounting assembly of claim 1, wherein the cups comprise at least one of rubber, silicone, and elastomer.

11. A grease gun mounting assembly comprising:

a connector having engaged thereto a first tube and a second tube such that the first tube and the second tube are substantially parallel, the first tube being sized such that the first tube is configured for insertion of a grease gun into an upper end thereof, the second tube being sized such that the second tube is configured for insertion of a hose extending from the grease gun, the connector being configured to be engageable to an object such that the first tube and the second tube are selectively engageable to the object, wherein the first tube and the second tube are configured for insertion of the grease gun and the hose, respectively, for mounting the grease gun and the hose to the object;

the first tube having a notch extending thereinto from the upper end such that the notch is proximate to the second tube, wherein the notch is configured for positioning of the hose for facilitating insertion of the hose into the second tube, the second tube being dimensionally shorter than the first tube, such that an upper limit of the second tube is positioned below the notch;

the first tube having a cutout extending thereinto from the upper end, the cutout tapering arcuately from a first face of the first tube, opposite the notch, to a second face of the first tube, in which the notch is positioned, wherein the cutout is configured for receiving a handle of the grease gun as the grease gun is inserted into the first tube; and the connector being one of a set of connectors, the set of connectors comprising two connectors bracketing a midpoint of the first tube, the connector comprising:

a bar, the bar being arcuate, a pair of straps, each strap being engaged to and extending from a respective opposed end of the bar, and a pair of fasteners, each fastener being engaged to a respective strap distal from the bar, the fasteners being mutually engageable, wherein the straps are configured for looping around an element of the object, such that one fastener is positioned for engaging the other fastener for engaging the first tube and the second tube to the object, the fasteners comprising a side release buckle.

12. The grease gun mounting assembly of claim 11, wherein the connector comprises:

the bar; and a set of cups engaged to the bar, the cups being resiliently compressible, wherein the cups are configured for compressing between the bar and a surface of the object for suctionally engaging the first tube and the second tube to the object, the cups comprising at least one of rubber, silicone, and elastomer.

\* \* \* \* \*